June 19, 1951     O. F. QUARTULLO     2,557,513
HYDRAULIC STEERING MECHANISM
Filed Oct. 14, 1947     4 Sheets-Sheet 1
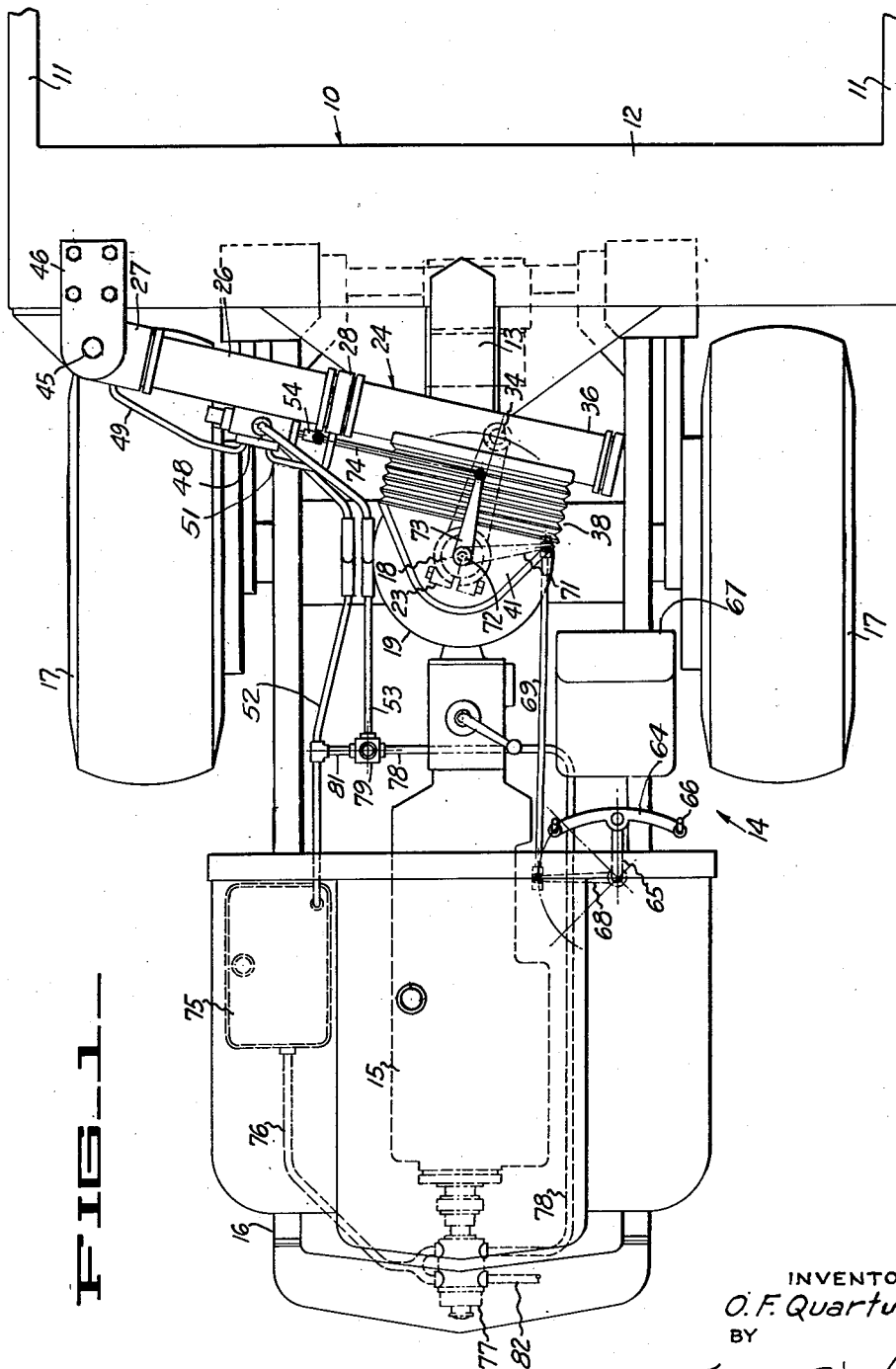
INVENTOR
O. F. Quartullo
BY
ATTORNEYS June 19, 1951 O. F. QUARTULLO 2,557,513
HYDRAULIC STEERING MECHANISM
Filed Oct. 14, 1947 4 Sheets-Sheet 2
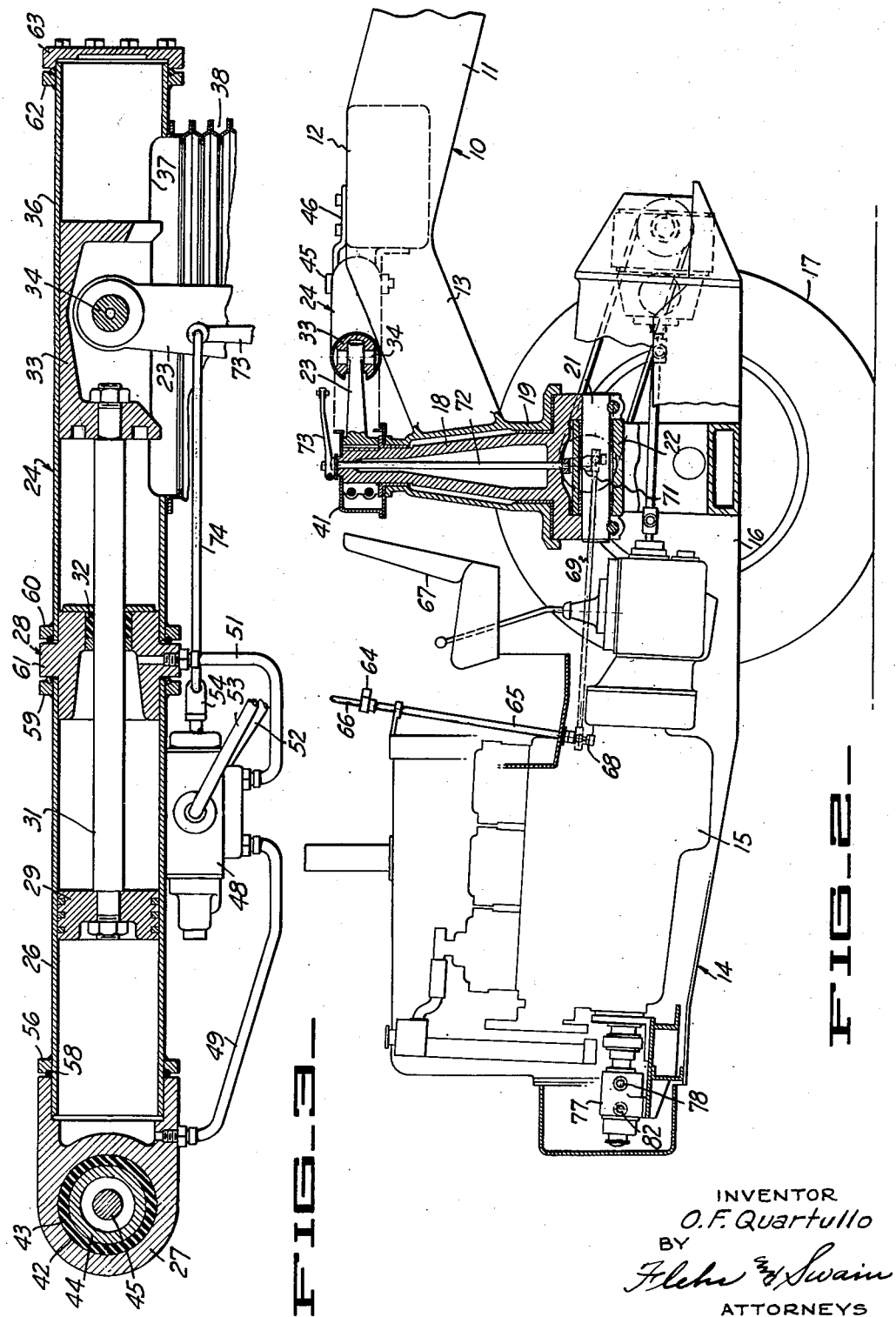
INVENTOR
O. F. Quartullo
BY
Fleher & Swain
ATTORNEYS

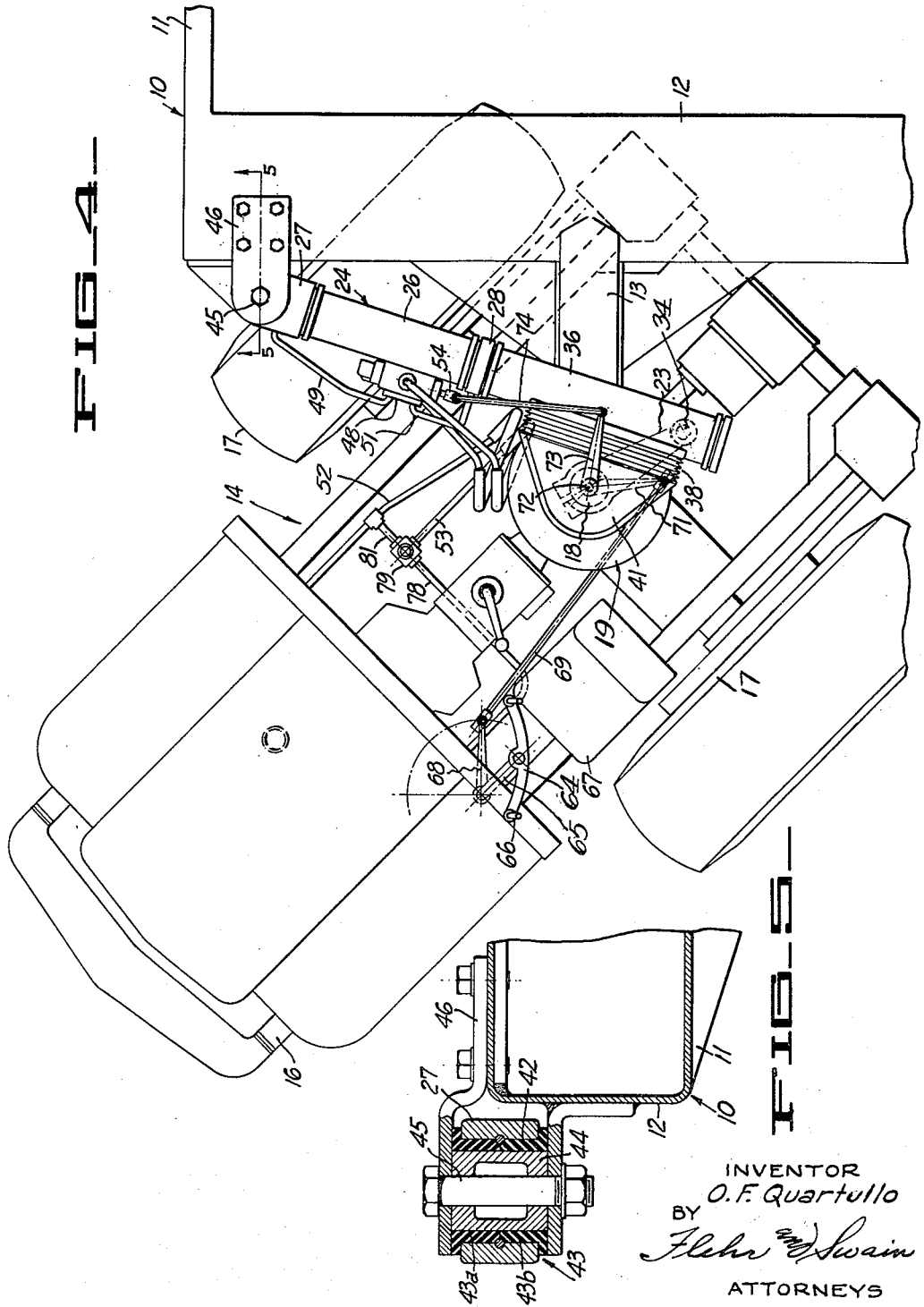

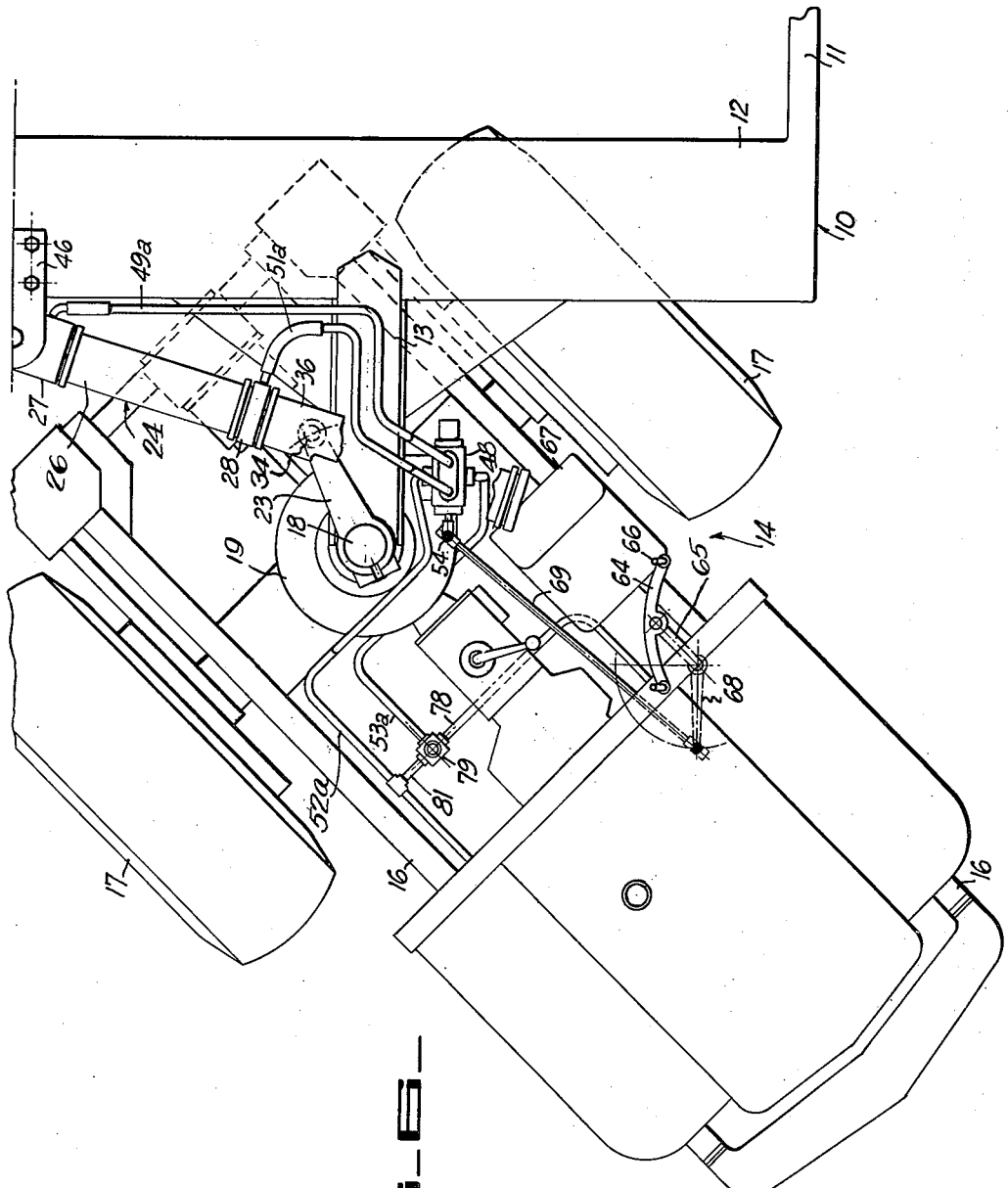

Patented June 19, 1951

2,557,513

UNITED STATES PATENT OFFICE 2,557,513

HYDRAULIC STEERING MECHANISM

Orpheus F. Quartullo, Cleveland, Ohio, assignor to Wooldridge Manufacturing Company, Sunnyvale, Calif., a corporation of Nevada Application October 14, 1947, Serial No. 779,730

4 Claims. (Cl. 180—79.2)

This invention relates generally to heavy duty vehicles of the type having a motor powered tractor attached to a trailer, and having power means for applying steering forces.

In the past various types of power steering arrangements have been developed for use with various types of heavy duty vehicles. One arrangement of this type is disclosed in Patent No. 2,368,202, in which a pair of hydraulic rams operate through mechanism including a chain whereby steering forces are applied between the trailer frame and the frame of the tractor. Prior steering arrangements have been relatively complicated with respect to the hydraulic or other power units employed, and with respect to the mechanical means employed to connect the units to the vehicle. In addition the manual steering control lever which is used to control the power steering means is generally a simple lever movable between limiting positions from a neutral or intermediate position. Movement from neutral to one limiting position causes the power steering unit to turn the tractor relative to the trailer at a constant rate which continues until the steering lever is returned to neutral position. Movement to the other limiting position causes turning of the tractor in an opposite direction. While in a limiting or steering position the steering lever remains stationary relative to the tractor and therefore it does not indicate the position of the tractor relative to the trailer.

It is an object of the present invention to provide an improved heavy duty vehicle of the above type having a simplified type of hydraulic power steering.

A further object of the invention is to provide a vehicle of the above character having an improved hydraulic operation and an improved means for making connections between the operator and parts of the vehicle.

Another object of the invention is to provide a heavy duty vehicle of the power steered type in which the control lever actuated by the operator has a follow through movement, whereby the steering radius of the machine is indicated to the operator.

Additional objects and features of the invention will appear from the following description in which the preferred embodiment has been set forth in detail in conjunction with the accompanying drawing.

Referring to the drawing:

Figure 1 is a plan view illustrating the forward position of a vehicle incorporating the present invention.

Figure 2 is a side elevational view of the same vehicle shown in Figure 1.

Figure 3 is a cross-sectional detail showing the hydraulic operator, and its operative connections to the vehicle.

Figure 4 is a plan view like Figure 1 but showing the tractor in one extreme steering position.

Figure 5 is an enlarged cross-sectional detail taken along the line 5—5 of Figure 4.

Figure 6 is a plan view similar to Figure 1 but illustrating another embodiment of the invention.

The vehicle incorporating the present invention can be a motor powered carrier scraper of the type disclosed for example in Patent No. 2,-368,202. The trailer of this vehicle includes a frame, a substantial part of which consists of a yoke 10 which has rearwardly extending side arms 11, and the transverse forward beam 12. A draft extension 13 is attached to the central portion of beam 12, and is adapted to be connected to the tractor 14, as will be presently explained.

The motor powered tractor 14 includes the frame 16, carried by the aligned wheels 17. A suitable driving motor 15 is carried by the forward portion of the frame, and serves to drive the wheels through suitable clutch, transmission, and differential units. Such parts of the tractor may be conventional.

The means serving to connect the tractor with the trailer frame include a vertical kingpin 18 which is journaled within a hub 19 attached to the frame extension 13. The lower end of the kingpin carries a horizontal extending pin 21, which is journaled to a member 22 carried by the frame 16. This forms in effect a cradle connection enabling oscillating movement of the tractor about a generally horizontal axis extending longitudinally of the tractor frame.

The upper end of the kingpin 18 extends from the hub 19 and is keyed to a steering arm 23. The free end of this arm is attached in a particular manner to a hydraulic operator 24, which in turn is attached to the trailer yoke 10.

A desirable form of hydraulic operator is illustrated in Figure 3. It consists of a metal tube 26 having its one end secured to the mounting head 27, and its other end closed by the flanged bonnet 28. A piston 29 is fitted in the cylinder, and is attached to a rod 31 which extends through the bonnet 28. The bonnet is provided with suitable packing gland or sealing means 32 to prevent leakage past the rod 31. The exterior end of rod 31 is attached to the member 33, which in turn is pivotally connected by pin 34 with the free end of the steering arm 23.

Bonnet 28 also serves to mount a rigid guide tube 36, which fits about member 33, and which has a side opening 37 to accommodate the steering arm 23. Member 33 has a cylindrical periphery which snugly fits within the tube 36, whereby member 33 is guided and braced against lateral cocking, while at the same time enabling some turning of member 33 about its axis to accommodate for mechanical inaccuracies. In order to protect the parts just described it is desirable to provide a flexible accordion type guard 38 which encloses the steering arm 23, and which extends from the tubular guide 36, to a metal shroud 41 (Figure 2) which is applied over the upper extension of the kingpin.

The head 27 of the hydraulic operator is suitably secured to the frame yoke 10, as illustrated for example in Figures 1, 4 and 6. Preferably this attachment permits a certain amount of "give" or resiliency between the hydraulic operator and the frame of the trailer. Thus the head 27 is provided with a vertically extending bore 42, fitted with the two parts 43a and 43b of a resilient rubber sleeve or bushing 43. The bushing fits upon a metal core 44 which in turn is journaled on the mounting pin 45. The adjacent portion of the yoke beam 12 is provided with a bracket 46 to which the ends of pin 45 are secured.

Application of liquid under pressure to the hydraulic operator is controlled by the valve 48, which in the embodiment illustrated in Figure 3 is mounted on one side of the tubular cylinder 26. This valve has a hydraulic pipe connection 49 to one end of the cylinder through the head 27, and another connection 51 to the other end of the cylinder through the bonnet 28. Two pipes 52 and 53 connect with valve 48, one leading to a return reservoir, and the other from the pressure pump, as will be presently explained. When the operating member 54 of this valve is moved in one direction, liquid under pressure is supplied to one end of the cylinder, as for example the left end as viewed in Figure 3, to force the piston 29 towards the right, while at the same time liquid is expelled from the right hand end of the cylinder and returned to the supply reservoir of the system. Movement of control member 54 to its other limiting position causes liquid under pressure to be supplied to the right hand end of the cylinder, whereby the piston 29 is moved to the left, and liquid expelled from the left hand end of the cylinder.

It will be evident that the detailed construction of the hydraulic operator may vary in practice, provided it affords sufficient forces for proper steering and sufficient ruggedness to withstand service conditions. The particular construction illustrated is desirable from the standpoint of simplicity of manufacture and durability. It will be noted in this connection that the ends of the tubular members 26 and 36 are provided with flanges which in turn enable attachment to other parts of the assembly. Thus flange 56 is secured adjacent one end of tube 26, and is secured as by clamping screws to the adjacent shoulder of the head 27. A metal sealing ring 58 is clamped tightly between the opposed annular surfaces of the clamping ring and head, in order to provide a fluid tight seal. Flanges 59 and 60 are similarly attached to the adjacent ends of the tubular members 26 and 36, and are secured as by means of bolts to the flange 61 provided on the bonnet or coupling member 28. Another flange 62 is secured to the end of tube 36, and is attached by screws or bolts to the cap 63. The assembly comprising the two tubes 26 and 36, coupled together by the bonnet 28, and attached at one end to the head 27, affords considerable strength against lateral bending, whereby it is able to perform its function without failure irrespective of the relatively heavy steering and shock forces to which it may be subjected.

The manually operated means provided for the control valve 48 includes a control lever 64 attached to the steering post 65, and provided with hand grips 66. This lever is conveniently positioned in front of the operator's seat 67, whereby it may be manually turned in either direction in the same manner as a conventional automotive steering wheel. The lower end of rod 65 is attached to arm 68, which in turn is connected to the control valve 48 through motion applying mechanism including the link rod 69, arm 71 located at the lower end of the kingpin, a shaft 72 extending axially through the kingpin and journaled thereto, arm 73 which is attached to the upper end of shaft 72, and a link rod 74 which connects the free end of arm 73 with the operating member 54 of the control valve 48. Arm 73 extends generally in the same direction as the steering arm 23, and arm 71 at the lower end of the kingpin extends generally laterally of the machine.

With the motion applying mechanism as illustrated and assuming that the tractor occupies a position with respect to the trailer as shown in Figure 1, turning of lever 64 in a clockwise direction causes rotation of arm 73 in a counter-clockwise direction, with the result that the valve control member 54 is moved to apply liquid under pressure to the left hand side of piston 29 as viewed in Figure 3, whereby the hydraulic operator rotates steering arm 23 in a clockwise direction as viewed in Figure 1, to turn the tractor to the right relative to the trailer. As the tractor continues to turn about the vertical axis of the kingpin a follow through movement is imparted to the lever 64, whereby this lever likewise turns in a counter-clockwise direction relative to the tractor. Thus when the tractor assumes the position of Figure 4, lever 64 will have turned a considerable distance such as illustrated in this view, whereby its position at any one time serves to indicate to the operator the approximate steering position of the tractor.

Assuming that the operator wishes to arrest turning of the tractor about the axis of the kingpin, lever 64 is moved counter-clockwise back to a neutral position. Assuming that one wishes to turn the tractor in an opposite direction to that illustrated in Figure 4, lever 64 is turned counter-clockwise whereby the hydraulic control valve 48 reverses the action of the hydraulic operator, to thereby commence rotation of the tractor in a counter-clockwise direction as viewed in Figure 4. It should be understood in this connection that the movement of the lever 64 between the two limiting positions required for reversing the hydraulic operator, is a relatively small fraction of the follow through movement of the lever as the tractor turns. Thus the follow through action of the lever 64 indicates the approximate position of the tractor to the operator, so that when he becomes thoroughly familiar with the action of the machine, it is a simple matter for him to judge the turning radius of the machine for a given position of the lever 64.

It will be evident that various types of hydraulic systems can be used to supply liquid under pressure to the hydraulic operator. The arrangement illustrated includes an oil reservoir 75 which connects with the pipe 52 leading from the control valve 48. The pipe line 76 leads from the oil reservoir to the hydraulic pump 77. Pressure pipe line 78 leads from the pump 77 and connects with pipe 53, through the pressure relief valve 79. The discharge side of the pressure relief valve 79 is connected by pipe 81 to the return pipe 52. Pump 77 may be of the duplex type as illustrated, thus providing an additional pressure line 82 for other hydraulic operators. Pipes 52 and 53 include suitable flexible hose sections to accommodate steering movement.

As shown in Figure 6 the control valve 48 may be mounted on the lower part of the hub 19 instead of on the operator. In this instance pipes 49a and 51a correspond with pipes 49 and 51 of Figure 1 and include flexible hose sections. Pipes 52a and 53a correspond to pipes 52 and 53 of Figure 1 and also include hose sections. Link rod 69 connects directly with the operating member 54 of the control valve 48. The operation of this arrangement is substantially the same as Figure 1 and the same follow up action is obtained.

It will be evident that the power steered vehicle described above is relatively simple in mechanical construction. Only one hydraulic operator is required and this operator is mounted in such a fashion that it is carried by the frame of the trailer and is not apt to be injured during normal use of the machine. Although the hydraulic operator has a relatively long stroke and is capable of turning the tractor through a total angle with the respect to the trailer of the order of 90°, it is relatively rugged in construction, and the connection to the steering arm 23 is adequately braced against side cocking. At the same time the machining of the parts need not be highly accurate, particularly because of the manner in which the connecting member 33 is free to turn relative to the guide tube 36. The mounting of the hydraulic operator upon the frame of the trailer through the use of the rubber bushing 43 permits a certain amount of give or resiliency in the steering connection, thus greatly minimizing shock stresses. The follow through action of the steering lever 64 aids the operator in maneuvering the vehicle, and particularly facilitates his judgment with respect to the turning radius.

I claim:

1. In a vehicle construction, a tractor including a frame, a trailer including a frame, a vertically extending kingpin having a pivotal connection between its lower end and the frame of the tractor, the pivotal connection being on an axis extending generally longitudinally of the tractor frame, a journal for the kingpin formed on the forward end of the trailer frame, a steering arm attached to the kingpin, a hydraulic operator having a cylinder and an operating rod extending in a general horizontal direction from the same and toward the free end of said steering arm, means serving to pivotally mount the cylinder on the frame of the trailer, a guide block attached to the free end of the operating rod and having a pivotal connection with the free end of the steering arm, and a guide means for said block carried solely by said hydraulic operator.

2. In a vehicle construction, a tractor including a frame, a trailer including a frame, a vertically extending kingpin having a pivotal connection between its lower end and the frame of the tractor, the pivotal connection being on an axis extending generally longitudinally of the tractor frame, a journal for the kingpin formed on the forward end of the trailer frame, a steering arm attached to the kingpin, a hydraulic operator having a horizontally extending cylinder and a horizontal operating rod extending toward the free end of the steering arm, means serving to pivotally mount the cylinder on the frame of the trailer, a guide block attached to the free end of the operating rod and having a pivotal connection with the free end of the steering arm, said block having a cylindrical exterior surface, and guide means in the form of a rigid cylindrical tube carried solely by the cylinder and serving to slidably guide the block for both horizontal and turning movements of the same about the axis of the operating rod.

3. In a vehicle construction, a power tractor including a frame, a trailer including a frame, a vertically extending kingpin having a pivotal connection between its lower end and the frame of the tractor, said connection being on an axis extending generally longitudinally of the tractor frame, a journal for the kingpin formed on the forward end of the trailer frame, hydraulic power steering means serving to turn the kingpin relative to the frame of the tractor, control valve means for controlling said hydraulic power steering means and carried by the trailer, a hand operated steering member rotatably mounted upon the tractor, and motion connecting means extending from said member to said control valve, said means comprising a rotatable rod extending longitudinally through the kingpin, motion transmitting means connecting one end of the rod to the control valve, and motion transmitting means connecting the other end of the rod to said steering member.

4. In a vehicle of the type described, a tractor, a vertical kingpin connected to the tractor, a trailer including a frame journaled to the kingpin, a steering arm attached to the upper end of the kingpin, a hydraulic operator of the double-acting ram type, said operator including a generally horizontal cylinder and piston assembly and an operating rod connected to the piston and extending from one end of the cylinder, means including a resilient rubber bushing serving to mount the other end of the cylinder on the trailer frame, to thereby permit limited pivotal movement of the cylinder in both horizontal and vertical directions relative to the trailer frame, a guide block secured to the free end of the piston rod and pivotally attached to the free end of the steering arm on a vertically extending pivotal axis, and means carried solely by said cylinder forming a guideway for said block, said guideway permitting rotation of the block about the axis of said piston rod.

ORPHEUS F. QUARTULLO.

REFERENCES CITED

The following references are of record in the file of this patent:

UNITED STATES PATENTS

| Number | Name | Date |
|---|---|---|
| 2,177,934 | Britton et al. | Oct. 31, 1939 |
| 2,305,795 | Schieferstein | Dec. 22, 1942 |
| 2,362,262 | French | Nov. 7, 1944 |
| 2,374,410 | Brumbaugh | Apr. 24, 1945 |
| 2,391,819 | Creson | Dec. 25, 1945 |